Patented Nov. 9, 1926.

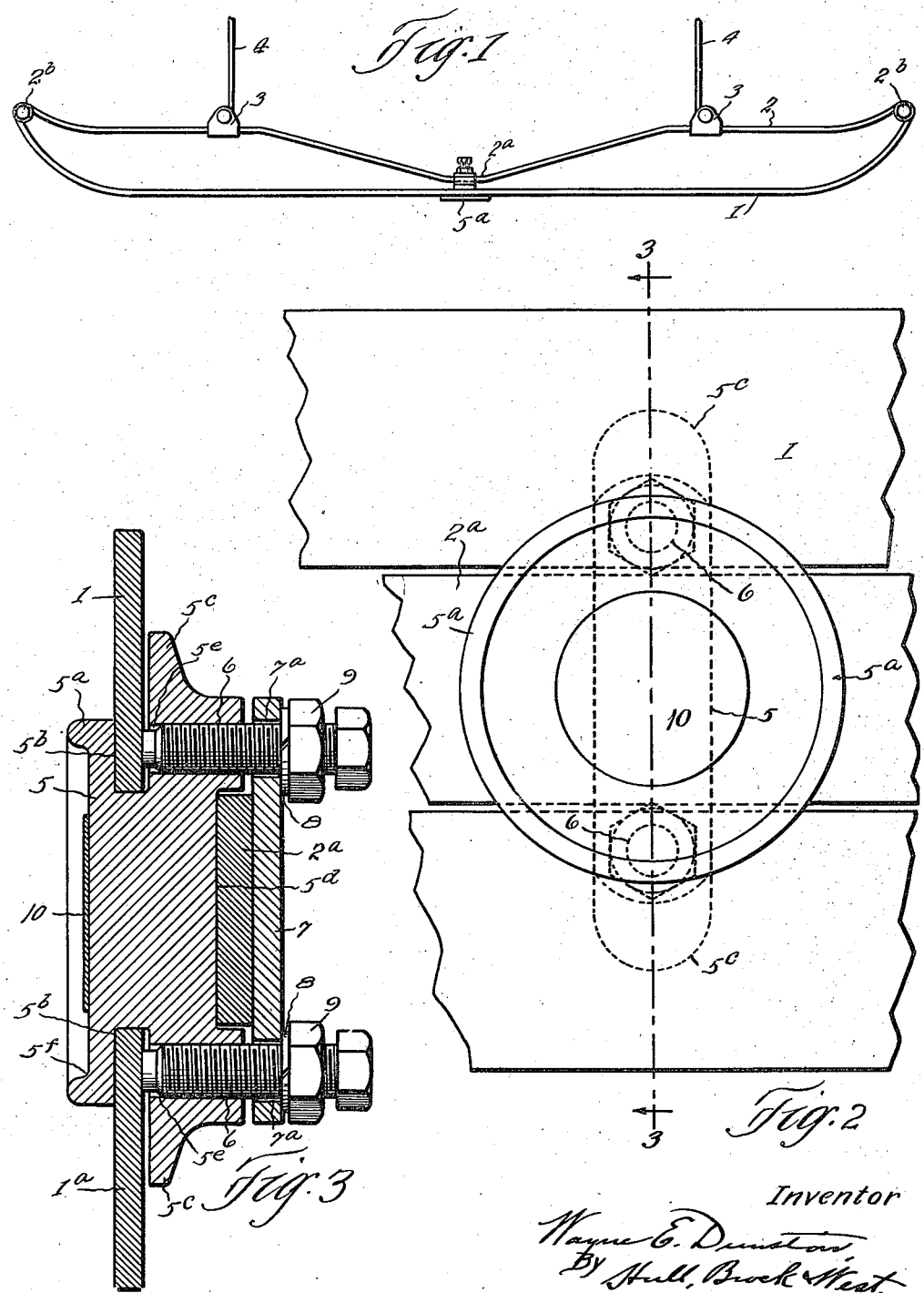

1,606,155

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER-CLAMPING DEVICE.

Application filed January 12, 1925. Serial No. 1,795.

This invention relates to means for clamping together portions of automobile bumpers, and more particularly to means for clamping together the central portions of bumpers of the type shown in the McGregor Patent No. 1,372,154, issued March 22, 1921, wherein a pair of vertically spaced front or impact bars are connected at their centers to the central portion of a rear or auxiliary bar.

It is the general purpose and object of the invention to provide a clamp of the character referred to which can be applied to and removed from the aforesaid bars in a convenient manner and which, when so applied, will enable the parts to be secured together in an efficient manner and which will prevent the rattling of the parts so secured. Further and more limited objects of the invention will appear hereinafter and will be realized in and through the construction and arrangement of the parts shown in the drawing, wherein Fig. 1 represents a plan view of a bumper having applied thereto a clamp made in accordance with my invention; Fig. 2 a detail in elevation of the said clamp, together with the associated bumper bars; and Fig. 3 a detail in section corresponding to the line 3—3 of Fig. 2.

Describing the various parts by reference characters, 1 denotes the upper and 1ª the lower front or impact bar of a bumper, the said bars being shown as extending for the full width of the bumper and being arranged in parallel relation, the ends of the said bars being curved rearwardly and connected as by means of bolts 2ᵇ extending through eyes at the ends of such bars and through the interposed eyes (not shown) at the ends of a rear or auxiliary bar, the said rear or auxiliary bar being indicated generally at 2 and having a central portion 2ª projected toward, but shown as spaced a short distance from, the rear faces of the central portions of the bars 1, 1ª. The bumper thus far described is substantially identical with that shown in the McGregor patent aforesaid and is shown as supported by pivot clamps 3 and arms 4, the arms being designed for connection, in any approved manner, to the cooperating side members of the vehicle.

For convenience of description, the bumper will be assumed as applied to the front of an automobile, and the terms "front" and "rear" will be employed for the purpose of designating the relative locations of the parts with respect to one another, but without any intention thereby to limit the use of my bumper to any particular portion of the vehicle.

For the purpose of securing the central parts of the bars 1, 1ª to the central part of the bar 2ª, I have provided the clamp shown in detail in Figs. 2 and 3. This clamp comprises a front or outer member and a rear or inner member, the front member consisting generally of a body 5, which may be made of die-cast aluminum alloy, or other suitable material. The body 5 is provided with a cylindrical front portion 5ª which extends rearwardly from the front thereof a sufficient distance to enable upper and lower vertical seats 5ᵇ to be formed therein for the bottom of the bar 1 and the top of the bar 1ª respectively. The seats are conveniently formed by providing the body 5 with upper and lower slots which are of greater width than the thickness of the stock of which the bars 1 and 1ª are composed. At the rear of these seats, the body 5 is extended vertically, above and below, as indicated at 5ᶜ. The block is provided in its rear face with a recess 5ᵈ for the central portion of the rear bar 2ª, the recess being of less fore-and-aft depth than the thickness of the stock of which the rear bar is composed. Holes are provided in the parts of the block 5 rearward of the seats 5ᵇ and respectively below and above the top and bottom of the cylindrical part 5ª of such body. These holes, indicated at 5ᵉ, are threaded for the reception of set screws 6, the said screws extending through apertures 7ª at the top and bottom of a rear or inner clamping member 7. It will be evident that, by setting up the set screws 6, the front bars 1, 1ª will be forced firmly against the front faces of their respective seats 5ᵇ. For the purpose of securing the central portion 2ª of the rear bar in its recess 5ᵈ, each set screw is provided with a washer 8 and a lock nut 9. By setting up these lock nuts, the rear clamping member 7 is forced toward the front or main clamping member, whereby the rear bar is firmly clamped in the seat provided by and between the said clamping members.

The front of the clamping member 5 is recessed, providing a circular cavity within which a name plate 10 may be inserted and affixed in any suitable manner to the said body.

The clamp disclosed herein is extremely simple of production, but is capable of being conveniently applied to bumpers of the type shown herein and, when so applied and the lock nuts set up, will operate to effect a rigid connection between the central portions of the bars and rigid and non-rattling connections between the said bars and the clamp.

Having thus described my invention, what I claim is:—

1. The combination, with the upper and lower impact bars and the intermediate auxiliary bar of a bumper, of means for securing portions of the said bars together, the said means comprising a clamping member having a body provided with an upper downwardly extending seat and with a lower upwardly extending seat for the lower edge portion of the upper impact bar and the upper edge portion of the lower impact bar, respectively, a second clamping member adapted to engage the rear or inner face of the auxiliary bar and forming with the first member a seat for such bar and provided with apertures located above and below the top and bottom of said bar, respectively, set screws extending through said apertures and threaded through the first clamping member and adapted to engage the rear faces of the impact bars thereby to force them against the front walls of their cooperating seats, and nuts on said screws adapted to force the second clamping member toward the first clamping member thereby to clamp the rear or auxiliary bar within its seat.

2. The combination, with the upper and lower impact bars and the intermediate auxiliary bar of a bumper, of means for securing portions of the said bars together, the said means comprising a clamping member having a body provided with an upper downwardly extending seat and with a lower upwardly extending seat for the lower edge portion of the upper impact bar and the upper edge portion of the lower impact bar, respectively, and with a seat extending thereinto from the rear face thereof and of less depth than the thickness of the stock of the rear bar, a second clamping member adapted to engage the rear or inner face of the auxiliary bar and provided with apertures located above and below the top and bottom of such bar, respectively, set screws extending through said apertures and threaded into the first clamping member and adapted to engage the rear faces of the upper impact bars thereby to force them against the front walls of their cooperating seats, and lock nuts on said screws adapted to force the second clamping member toward the first clamping member, thereby to clamp the rear or auxiliary bar within its seat.

3. The combination, with the upper and lower impact bars and the intermediate auxiliary bar of a bumper, of means for securing the said bars together, said means comprising a clamping member having a downwardly extending seat in the upper portion thereof for the lower edge portion of the upper bar and an upwardly extending seat in the lower portion thereof for the upper edge portion of the lower bar and provided with a recess in the rear or inner face thereof forming a seat for the intermediate bar, a second clamping member for forcing the intermediate bar into said seat, means for forcing the portions of the impact bars that are within the seats in the first mentioned member against the front or outer faces of said seats, and means cooperative with the last-mentioned means for forcing the second member toward the first member.

4. The combination, with the upper and lower impact bars and the intermediate auxiliary bar of a bumper, of means for securing the said bars together, said means comprising a clamping member having a downwardly extending seat in the upper portion thereof for the lower edge portion of the upper bar and an upwardly extending seat in the lower portion thereof for the upper edge portion of the lower bar and provided with a recess in the rear or inner face thereof forming a seat for the intermediate bar, a second clamping member for forcing the impact bar into said seat, means for securing the second clamping member to the first clamping member, and means for forcing the portions of the impact bars that are within the seats in the first mentioned member against the front or outer faces of said seats.

5. The combination, with the upper and lower impact bars and the intermediate auxiliary bar of a bumper, of means for securing the said bars together, said means comprising a clamping member having a seat for the lower edge and the lower front or impact face of the upper impact bar and a lower seat for the upper edge and the upper front or impact face of the lower impact bar, a second clamping member arranged to form with the first clamping member a seat for the reception of the rear or auxiliary bar, means for forcing the said members together to clamp the rear or auxiliary bar, and means for securing the impact bars within their respective seats.

6. The combination, with the upper and lower impact bars and the intermediate auxiliary bar of a bumper, of means for securing the said bars together, said means comprising a clamping member having a seat for the lower edge and the lower front or impact face of the upper impact bar and a lower seat for the upper edge and the upper front or impact face of the lower impact bar, a second clamping member arranged to form with the first clamping member a seat for the reception of the rear or auxiliary bar, set screws threaded into the first mentioned member above and below the rear or auxiliary member and adapted to engage the rear or inner faces of said impact bars and force the front faces of such bars against their respective seats, the said set screws extending through the second clamping member, and means on said screws for forcing the second clamping member toward the first clamping member thereby to secure the rear or auxiliary bar in place.

7. The combination, with the upper and lower impact bars and the intermediate auxiliary bar of a bumper, of means for securing the said bars together, said means comprising a clamping member having a seat for the lower edge and the lower front or impact face of the upper impact bar and a lower seat for the upper edge and the upper front or impact face of the lower impact bar, means mounted in said clamping member for engaging the rear faces of the impact bars and for forcing the front faces thereof against their respective seats, and means for clamping the rear or auxiliary bar to said member.

8. The combination, with the upper and lower impact bars and the intermediate auxiliary bar of a bumper, of means for securing the said bars together, said means comprising a clamping member having a seat for the lower edge and the lower front or impact face of the upper impact bar and a lower seat for the upper edge and the upper front or impact face of the lower impact bar, threaded means mounted in said member for forcing the front faces of the impact bars against the front walls of their respective seats, and means including said threaded means for securing the said clamping member to the rear or auxiliary bar.

In testimony whereof, I hereunto affix my signature.

WAYNE E. DUNSTON.